(12) United States Patent
Bar et al.

(10) Patent No.: US 7,890,109 B2
(45) Date of Patent: Feb. 15, 2011

(54) MOBILE TERMINAL DEVICE FOR RECEIVING PACKET-ORIENTED RADIO SIGNALS

(75) Inventors: Siegfried Bar, Unterschleissheim (DE); Yves Surantyn, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1113 days.

(21) Appl. No.: 11/569,762

(22) PCT Filed: Nov. 19, 2004

(86) PCT No.: PCT/EP2004/053012

§ 371 (c)(1), (2), (4) Date: Nov. 29, 2006

(87) PCT Pub. No.: WO2005/071986

PCT Pub. Date: Aug. 4, 2005

(65) Prior Publication Data

US 2009/0042586 A1    Feb. 12, 2009

(30) Foreign Application Priority Data

Jan. 27, 2004    (DE)    ........................ 10 2004 004 092

(51) Int. Cl.
H04W 88/02    (2009.01)
(52) U.S. Cl. .................................................... 455/438
(58) Field of Classification Search .............. 379/32.03; 455/438
See application file for complete search history.

(56) References Cited

U.S. PATENT DOCUMENTS

| 7,373,174 | B2 * | 5/2008 | Perez et al. ............... 455/556.1 |
| 2003/0032389 | A1 | 2/2003 | Kim et al. |
| 2003/0228892 | A1 | 12/2003 | Maalismaa et al. |
| 2009/0154902 | A1 * | 6/2009 | Ichinose ..................... 386/124 |

FOREIGN PATENT DOCUMENTS

| EP | 1237302 | 9/2002 |
| WO | WO0239758 | 5/2002 |
| WO | WO03045064 | 5/2003 |
| WO | WO03069886 | 8/2003 |
| WO | WO03088510 | 10/2003 |

* cited by examiner

Primary Examiner—Diane Mizrahi
(74) Attorney, Agent, or Firm—King & Spalding L.L.P.

(57) ABSTRACT

A mobile terminal device for a mobile telecommunication system is adapted to receive a telephone call, receive packet-oriented radio signals, and select at least one transmission service which is transmitted using the packet-oriented radio signals. The mobile terminal device is further adapted to receive a signal regarding a time slot from the network of the mobile telecommunication system, the time slot being determined in accordance with the selected transmission service. During the at least one time slot, the reception of the packet-oriented radio signal is suspended in order to receive a radio paging signal which signals a telephone call addressed to the mobile transmission device so that the mobile terminal device remains accessible to telephone calls during reception of the packet-oriented radio signals.

13 Claims, 1 Drawing Sheet

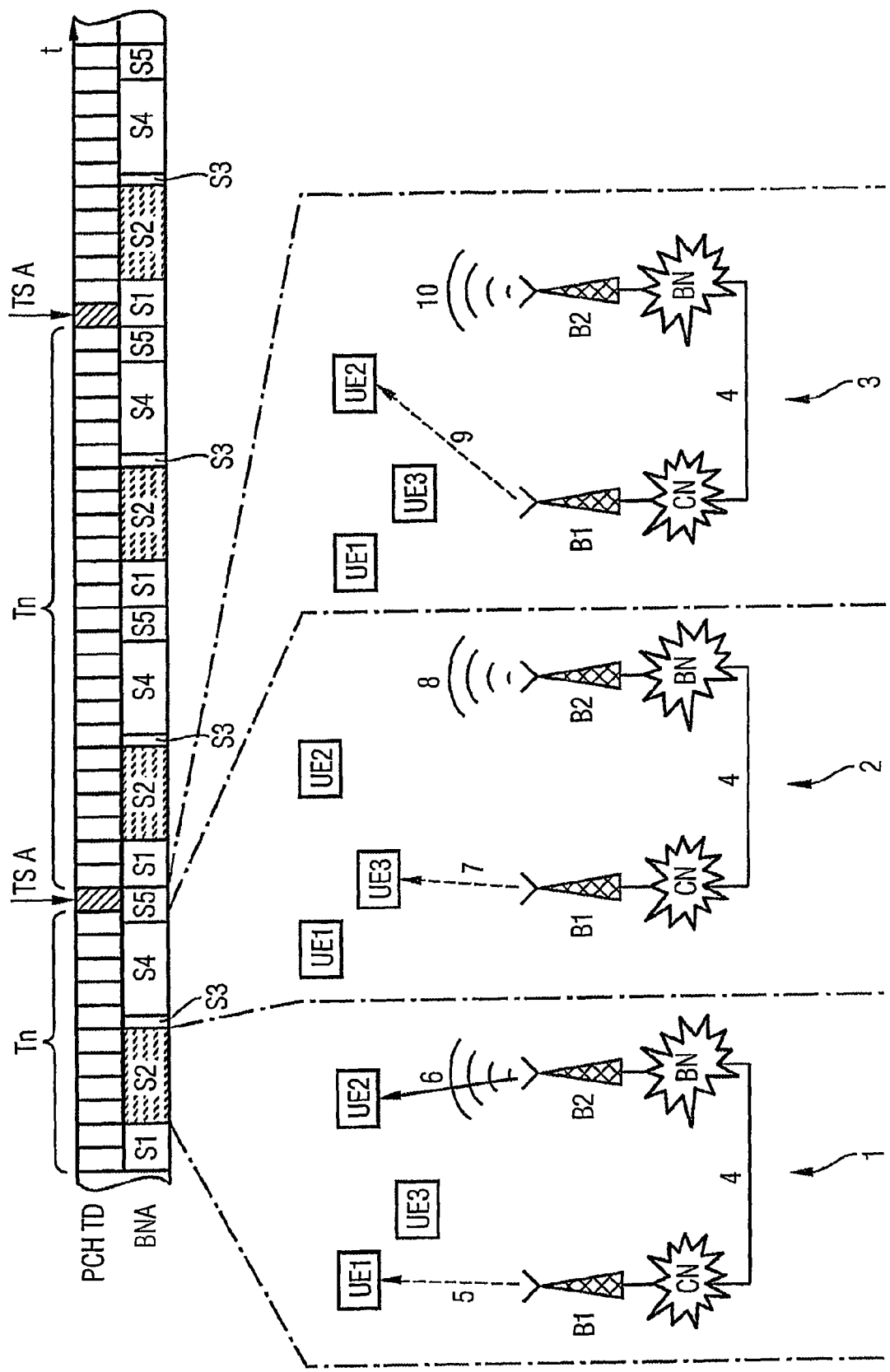

MOBILE TERMINAL DEVICE FOR RECEIVING PACKET-ORIENTED RADIO SIGNALS

FIELD OF THE INVENTION

The present disclosure relates to a mobile terminal device, in particular a mobile radio terminal, for a cellular mobile telecommunication system, and a method for receiving telephone calls and packet-oriented radio signals in a mobile terminal device, in particular a mobile radio terminal communicating in a cellular mobile telecommunication system.

BACKGROUND OF THE INVENTION

Mobile terminal devices or methods for receiving telephone calls and packet-oriented radio signals in a mobile terminal device are currently used in third generation mobile radio terminals among others.

To an increasing extent, mobile terminal devices operated according to standards such as GSM (global system for mobile communications) or UMTS (universal mobile communications system) are not designed for voice telephony alone. Users of such mobile terminal devices wish to be able to use those devices to receive further transmission channels, such as packet-oriented radio signals.

The transmission of items such as video streams at high data transfer rates is a standard feature in third generation mobile radio terminals such as those operated according to the UMTS standard. However, this situation gives rise to two basic problems. On the one hand users are faced with high transmission costs, and on the other capacity bottlenecks arise if for instance too many users call for video streams within a given UMTS radio cell.

So far there are few known mobile terminal devices which enable packet-oriented radio signals to be received at the same time as ensuring accessibility for telephone calls. However, they all consist of two independent units, each being responsible for receiving packet-oriented radio signals or for communicating with the cellular mobile telecommunication system.

BRIEF SUMMARY OF THE INVENTION

Under exemplary embodiments, a mobile terminal device and a method for operating the same is disclosed which will not only enable packet-oriented radio signals to be received, but at the same time ensure telephonic accessibility using relatively few components.

Under one exemplary embodiment, a mobile radio terminal for a cellular mobile telecommunication system comprises means for receiving a telephone call, means for receiving packet-oriented radio signals, and means for selecting at least one transmission service transmitted using the packet-oriented radio signals. The mobile terminal device preferably is designed to receive a signal regarding at least one time slot from the network of the mobile telecommunication system, said time slot having been determined in accordance with the selected transmission service, and is further designed so that during the at least one time slot it suspends reception of the packet-oriented radio signals and during the at least one time slot it receives a radio paging signal which signals a telephone call addressed to the mobile terminal device so that the mobile terminal device remains accessible for telephone calls during reception of the packet-oriented radio signals.

Another exemplary embodiment relates to receiving telephone calls and packet-oriented radio signals in a mobile terminal device, in particular a mobile radio terminal communicating in a cellular mobile telecommunication system. At least one transmission service transmitted using the packet-oriented radio signals is selected. The mobile terminal device receives a signal regarding a time slot from the network of the mobile telecommunication system, said time slot being determined in accordance with the selected transmission service. Reception of the packet-oriented radio signal is suspended during the at least one time slot, and during the at least one time slot a radio paging signal is received, signaling a telephone call addressed to the mobile terminal device so that the mobile terminal device remains accessible for telephone calls during reception of the packet-oriented radio signals.

The mobile terminal device disclosed herein can be any type of terminal device that enables voice communication in a cellular mobile telecommunication system and can also receive packet-oriented radio signals. It is preferably a mobile radio terminal, a smart phone or a personal digital assistant (PDA). The present disclosure is not restricted to any particular technology regarding the mobile radio standards that have to be used, provided the transmission method is time-slot based.

The information content to be transmitted in the packet-oriented radio signal is encoded into digital data packets and transmitted to all receivers in the transmission area by means of radio signals. As an example, the packet-oriented radio signal may be of the type known as a DVB signal. DVB (digital video broadcasting) is a digital video transmission standard that is broadcast by means of radio signals. Variants include a terrestrial variant DVB-T and a variant for mobile terminal devices known as DVB-H. The DVB-H variant is designed to use less energy than the DVB-T variant during signal reception, and the DVB-H variant is therefore preferably suited for use in mobile terminal devices.

The means for receiving packet-oriented radio signals enables the corresponding DVB signals to be received.

The means for receiving a telephone call enables a mobile terminal device in a cellular mobile telecommunication system to communicate with further mobile terminal devices. Such communication may take place for instance by means of the UMTS standard.

The means for selecting at least one transmission service in which transmission takes place by means of packet-oriented radio signals may be, for example, a menu structure on the display of the mobile terminal device, enabling the user of the mobile terminal device to select a transmission service. Such transmission services could conceivably be television channels. However, by preselecting the at least one transmission service the network operator is effectively in the position of performing the selection.

The paging channel PCH is preferably used for the radio paging signal. Paging via the paging channel PCH is used particularly in the case of the GSM and UMTS mobile radio standards. The paging channel is known as a downlink transport channel, that is, a radio channel which is always transmitted by the base station to the mobile terminal devices over the entire mobile radio cell. The paging channel PCH notifies the appropriate mobile terminal device that the network wishes to contact said mobile terminal device because for example there is a telephone call that needs to be forwarded to said device.

In a preferred embodiment the mobile terminal device has means for computing the time intervals in which the at least one transmission service is transmitted and means for transmitting the computed time intervals to the mobile telecommunication system network, so that the at least one time slot during which the mobile terminal device need not receive the selected transmission service can be determined in the network.

In the mobile terminal device, the means for selecting at least one transmission service is used in order to select a desired transmission service. The reception time profile appropriate to the transmission service is then computed in the terminal device, that is, the time intervals during which the packet-oriented radio signal from the transmission service must be received are determined. In this way the time intervals in which reception is not necessary are also determined. The mobile terminal device transmits this time profile to the mobile telecommunication system network.

The mobile telecommunication system network receives from the mobile terminal device the time profile computed in the mobile terminal device and searches for a paging time slot which does not overlap with the time intervals during which the mobile terminal device must receive the packet-oriented radio signal. The mobile telecommunication system network then informs the mobile terminal device about the time slot assigned for the radio paging signal. The assigned time slot is preferably a PCH time slot. From this point on, the mobile terminal device is aware of the instant at which telephone calls can be signaled via the paging channel.

In an alternative embodiment, the mobile terminal device has means for transmitting the selected transmission services to the mobile telecommunication system network. Then the time intervals in which the at least one transmission service will be received by the mobile terminal device, and depending on those, the at least one time slot during which the mobile terminal device need not receive the selected transmission services, can be computed in the network. In this embodiment also, the means for selecting at least one transmission service is used in the mobile terminal device to select a transmission service. The mobile terminal device then transmits this selection to the mobile telecommunication system network. The time intervals during which it is necessary to receive the packet-oriented radio signals and the time intervals in which such reception is not necessary are then calculated or determined in the mobile telecommunication system network. For this purpose the mobile telecommunication system network needs a connection to the network originating the packet-oriented radio signal. The mobile telecommunication system network then determines a paging time slot which does not overlap with the time intervals during which the mobile terminal device must receive the packet-oriented radio signals in order to correctly display the selected transmission service. The mobile telecommunication system network further informs the mobile terminal device about the time slot assigned for the radio paging signal. As before, said assigned time slot is preferably a PCH time slot. This embodiment has the advantage that there is reduced signaling between the mobile terminal device and the mobile telecommunication system network.

Further, the mobile terminal device preferably has means for transmitting the synchronization speed of said mobile terminal device to the mobile telecommunication system network. Different mobile terminal devices may be faster or slower on synchronization, such as during signal acquisition. This can affect the time profile and should be notified to the network.

In a development of the present invention, the mobile terminal device is able, on receiving a radio paging signal during the at least one time slot, to use the means for receiving a telephone call to establish a voice connection to the cellular mobile telecommunication system and to further suspend the reception of the packet-oriented radio signal. The mobile terminal device is thus in a position to receive packet-oriented radio signals and still be accessible to incoming telephone calls.

If no radio paging signal is received during the at least one time slot, the mobile terminal device is preferably able to resume receiving the packet-oriented radio signal during a subsequent time slot. Reception preferably resumes in the next time slot.

Furthermore the at least one time slot preferably recurs periodically. The mobile terminal devices are synchronized and therefore once they have received the signal notifying which time slot has to be monitored they are always aware of when the next time slot to be monitored will occur.

In a further embodiment of the invention, the at least one time slot has been assigned to a group of mobile terminal devices receiving the same transmission service from the packet-oriented radio signal. Each group member receives the same transmission service from the packet-oriented radio signal. Each group is assigned a special time slot during which the network can use the paging channel to call a mobile terminal device within said group. The mobile terminal device is aware of the group to which it belongs and of the time slot that has been assigned to it. This means that each mobile terminal device is aware of when the network can notify it about an incoming telephone call. Accordingly therefore it need only monitor the time slot during the time interval of the time slot. The time interval is relatively short, so that mobile terminal devices receiving no packet-oriented radio signals can save energy, since they monitor only the one time slot for the radio paging signal.

In a development of the present invention the mobile terminal device has only one mobile radio transmitting and receiving device for the means for receiving a telephone call and the means for receiving a packet-oriented radio signal. Simultaneous reception of packet-oriented radio signals and telephone calls is not necessary, since according to the invention, even during the reception of packet-oriented radio signals, telephone calls can be notified to the mobile terminal device by a signal. Consequently, for receiving packet-oriented radio signals and telephone calls the mobile terminal device needs only one receiving unit or only one transmitting and receiving device, also known as a transceiver module, having the necessary components such as a receiver, a modem, etc. Such a transceiver module need only be compatible with both systems and tunable between the two frequencies.

Compared to an embodiment with two transceiver modules, the provision of one transceiver module has advantages regarding size, power consumption and cost, and these are decisive advantages particularly in the case of terminal devices produced for the mass market.

Moreover the proposed solution requires no significant changes to the currently used transmission standards. Mobile terminal devices which do not support the features to which the invention relates can still be operated in the normal way and receive transmission signals or communicate with other cellular mobile telecommunication systems.

The present disclosure further relates to a broadcast network for transmitting packet-oriented radio signals. The broadcast network is connected to a cellular network and is able to transmit packet-oriented radio signals to a mobile terminal device to which the exemplary embodiment relate.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 is a diagram of an exemplary system for receiving telephone calls and packet-oriented radio signals.

DETAILED DESCRIPTION OF THE INVENTION

The upper half of the diagram in FIG. 1 shows two time slot distributions over time T. The upper row PCH TD shows the time slot distribution of the paging channel PCH and the lower row BNA shows the distribution of the multiplex in the broadcast network transmitting packet-oriented radio signals. A white time slot in the upper row means that no radio paging signals for the mobile terminal device UE2 are transmitted during the time slot concerned. A shaded time slot shows that there is activity during that time slot or the time slot is monitored.

It is clear from the activity of the broadcast network BNA that the transmission services S1, S2, S3, S4 and S5 are transmitted in the time multiplex. These transmission services are transmitted at different data transfer rates. During the time interval Tn there is no transmission via the paging channel PCH for the mobile terminal device UE2. The time slot TS A is kept free for transmission of a radio paging signal. At that moment the respective mobile terminal devices monitor the paging channel and await a radio paging signal notifying them of telephone calls addressed to the mobile terminal device.

The lower half of the diagram in FIG. 1 shows the states 1, 2 and 3, which will now be explained.

State 1 shows a mobile communication network with three mobile terminal devices UE1, UE2 and UE3. The mobile terminal devices UE1, UE3 are standard mobile radio terminals which can communicate by voice telephony only. The mobile terminal device UE2 is a dual mode device which can be operated in the two modes voice communication and packet-oriented radio reception. The mobile terminal device UE2 consequently has the ability to receive not only telephone calls but also packet-oriented radio signals, in particular DVB signals.

The mobile telecommunication system shown consists of a cellular network CN with a synchronized connection 4 to a broadcast network BN. The cellular network CN is connected to at least one base station B1 which can connect to the mobile terminal devices UE1, UE2 or UE3. The broadcast network BN is connected to a further base station B2 which transmits DVB signals to all subscribers in the transmission area.

As is clear from the state 1, there is a voice connection 5 between the cellular network CN and the mobile terminal device UE1 via the base station B1. The user of the mobile terminal device UE2 has selected on said mobile terminal device a television program S2 which is transmitted by means of a DVB signal. The DVB signal 6 is transmitted to the mobile terminal device UE2 by the broadcast network BN via the base station B2 during the time period shown in the line BNA.

Once the user of the terminal device UE2 had selected the television program S2, a time profile for receiving the associated DVB signals was computed in said terminal device. This time profile was transmitted to the cellular network CN, which used it to determine the time slot TS A and notified the mobile terminal device UE2 of this (not shown in the drawing).

In the state 2 the mobile terminal device UE2 does not need to receive any DVB signals for the television program S2. The base station B2 transmits DVB signals 8 for the transmission services S3, S4 and S5 only. It is still possible for other mobile terminal devices, in this case the mobile terminal device UE3, to be contacted via the paging channel with regard to incoming calls.

The state 3 shows the situation during the time slot TS A. The mobile terminal device UE2 only need monitor the radio channel PCH during this time slot, which the broadcast network BN notified to the mobile terminal device UE2 by a signal via the base station B2. If a call comes in for the mobile terminal device UE2, it is notified of this by a signal 9 via the paging channel PCH. During the time slot TS A, the base station B2 does not transmit any packet-oriented broadcast data needed for receiving the desired television program S2. Only data 10 that is relevant to the transmission service S5 is transmitted. The next possible opportunity to transmit a signal about an incoming call is at the instant of the periodically recurring time slot TS A at the end of the time interval Tn.

Since the base station B2 transmits the radio signals by packet-oriented means, the sequence in which the data packets are transmitted can be changed without any deterioration in the quality of service.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A mobile terminal device comprising:
   means for receiving a telephone call from a mobile telecommunications network;
   means for receiving packet-oriented radio signals; and
   means for selecting at least one transmission service which is transmitted using the packet-oriented radio signals, the mobile terminal device receiving at least one time slot from the mobile telecommunication network, said time slot having been determined in accordance with the selected transmission service, wherein, during the at least one time slot, the mobile terminal device suspends reception of the packet-oriented radio signals, and receives a radio paging signal which signals a telephone call addressed to the mobile terminal device so that the mobile terminal device remains accessible for telephone calls during reception of the packet-oriented radio signals.

2. The mobile terminal device as claimed in claim 1, further comprising:
   means for computing time intervals in which the at least one transmission service is transmitted; and
   means for transmitting the computed time intervals to the mobile telecommunication network, so that the at least one time slot during which the mobile terminal device need not receive the selected transmission service can be determined in the network.

3. The mobile terminal as claimed in claim 1, further comprising means for transmitting the selected transmission services to the mobile telecommunication network, so that the time intervals in which the at least one transmission service will be received by the mobile terminal device, and depending on those, the at least one time slot during which the mobile terminal device need not receive the selected transmission service, can be computed in the network.

4. The mobile terminal device as claimed in claim 3, further comprising means for transmitting the synchronization speed of the mobile terminal device to the mobile telecommunication network.

5. The mobile terminal device as claimed in claim 1, wherein, on receiving a radio paging signal during the at least one time slot, the means for receiving a telephone call is used to establish a voice connection to the cellular mobile telecommunication network and to further suspend the reception of the packet-oriented radio signal.

6. The mobile terminal device as claimed in claim 1, wherein, in response to no radio paging signal being received during the at least one time slot, the means for receiving resumes receiving the packet-oriented radio signal during a subsequent time slot.

7. The mobile terminal device as claimed in claim 6, wherein the at least one time slot recurs periodically.

8. The mobile terminal device as claimed in claim 7, wherein the at least one time slot has been assigned to a group of mobile terminal devices receiving the same transmission service from the packet-oriented radio signal.

9. The mobile terminal device as claimed in claim 8, wherein the packet-oriented radio signal is a digital video broadcasting (DVB) signal.

10. The mobile terminal device as claimed in claim 1, wherein the radio paging signal is the Paging Channel (PCH) used in GSM (global system for mobile communications) and UMTS (universal mobile communications system) radio standards.

11. The mobile terminal device as claimed in claim 1, wherein the mobile terminal device has only one mobile radio transmitting and receiving device for the means for receiving a telephone call an the means for receiving a packet oriented radio signal.

12. A mobile terminal device comprising:
at least one physical receiver configured to:
receive a telephone call from a mobile telecommunications network; and
receive packet-oriented radio signals; and
a user interface including a physical display device and allowing a user to select at least one transmission service which is transmitted using the packet-oriented radio signals, the mobile terminal device receiving at least one time slot from the mobile telecommunication network, said time slot having been determined in accordance with the selected transmission service, wherein, during the at least one time slot, the mobile terminal device suspends reception of the packet-oriented radio signals, and receives a radio paging signal which signals a telephone call addressed to the mobile terminal device so that the mobile terminal device remains accessible for telephone calls during reception of the packet-oriented radio signals.

13. A mobile terminal device comprising:

means for receiving a telephone call from a mobile telecommunications network;

means for receiving packet-oriented radio signals; and means for selecting at least one transmission service which is transmitted using the packet-oriented radio signals, the mobile terminal device receiving at least one time slot from the mobile telecommunication network, said time slot having been determined in accordance with the selected transmission service, wherein, during the at least one time slot, the mobile terminal device suspends reception of the packet-oriented radio signals, and receives a radio paging signal which signals a telephone call addressed to the mobile terminal device so that the mobile terminal device remains accessible for telephone calls during reception of the packet-oriented radio signals;

wherein the means for receiving the telephone call and the means for receiving packet-oriented radio signals are embodied in at least one transceiver module embodied at least in hardware components.

* * * * *